3,024,460
GASTUBE MICROWAVE RF MODULATOR
Ernest A. Dahl, Riverside, and Thomas I. Humphreys, Buena Park, Calif., assignors to the United States of America as represented by the Secretary of the Navy
Filed Oct. 26, 1955, Ser. No. 543,042
10 Claims. (Cl. 343—17.7)
(Granted under Title 35, U.S. Code (1952), sec. 266)

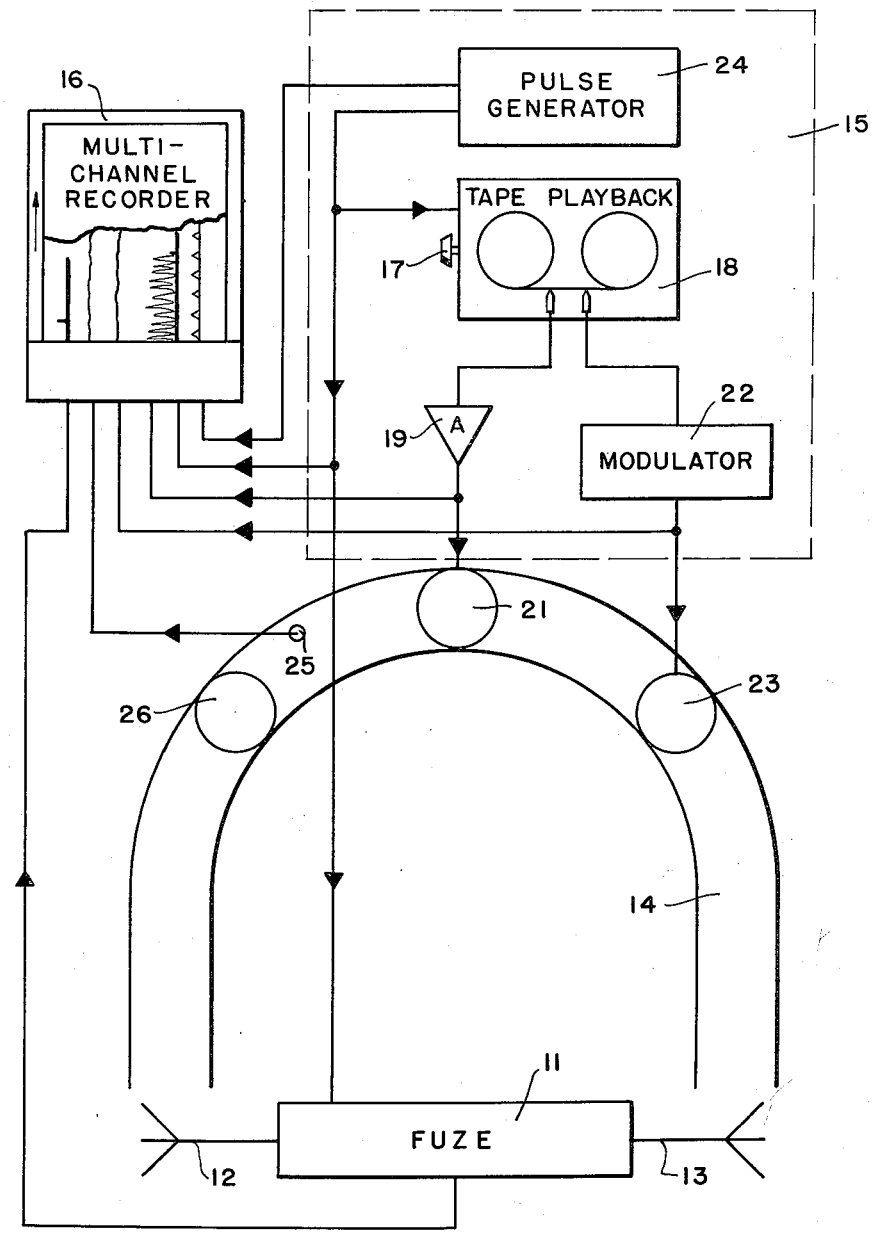

The invention described herein may be manufactured and used by or for the Government of the United States of America for governmental purposes without the payment of any royalties thereon or therefor.

This invention relates to a gastube microwave RF modulator and more particularly to such a modulator for simulating FM Doppler signals received by a fuze on missile to target intercept and including a gastube microwave RF attenuator. In the radio frequency testing of FM Doppler fuzes it is necessary to simulate the FM Doppler signals received by the fuze during a missile to target intercept.

The previous method utilizes a Doppler wheel to provide modulation, however, this method is capable of only one frequency of modulation at a rate considerably less than that required and does not provide for a variable attenuation of the signal to simulate closing of the missile on the target.

In one preferred embodiment of the present invention a U-shaped waveguide is provided and the fuze under test is mounted with its transmitting antenna adjacent one open end of the waveguide and its receiving antenna adjacent the other open end of the waveguide. A fuze modulation generator and timing base is provided with a closing rate adjustment and is connected to a test recorder. The modulation generator is also connected to a variable attenuator in the waveguide adjacent to the fuze receiving antenna. A fixed attenuator is positioned in the waveguide adjacent the fuze transmitting antenna. A microwave gas tube modulator is also connected to the fuze modulation generator and is mounted intermediate the fixed attenuator and variable attenuator in the U-shaped waveguide. When the fuze is transmitting sufficient power past the fixed attenuator, the fuze modulation generator is started and modulates the FM/RF energy in the waveguide to represent the Doppler effect at the closing rate between fuze and missile by modulation of the gastube in the waveguide. A manual closing rate adjustment is provided on the fuze modulation generator which controls the Doppler effect and this adjustment also controls the variable attenuator to increase the signal which is passed to the fuze receiver equivalent to the decreasing distance between the fuze and target. At a proper time dependent upon the fuze computer action, received Doppler signal, and strength of signal, the fuze will send a firing pulse to the recorder completely checking the fuze operation.

One object of the present invention is to provide a means of phase modulating a frequency modulated signal to provide a signal suitable for testing FM Doppler fuzes.

Another object of the present invention is to provide a method and apparatus for modulating a frequency modulated signal whereby either AM or FM modulation can be achieved according to the location of the modulation tube and type of cavity.

A further object of the present invention is to provide a method and apparatus for modulating a frequency modulated signal to simulate the Doppler effect and variable attenuation resulting from a missile approaching a target.

Still another object of the present invention is to provide a method and apparatus for modulating a frequency modulated signal whereby the frequency of modulation as well as the rate of attenuation may be selectively varied as desired.

Other objects and many of the attendant advantages of this invention will be readily appreciated as the same becomes better understood by reference to the following detailed description when considered in connection with the accompanying drawings wherein the single figure is a schematic block diagram illustrating one preferred form of the present invention.

Referring now to the drawings in detail, a fuze 11 is shown schematically with its transmitting antenna 12 and its receiving antenna 13 mounted adjacent the opposite ends of the open ended loop or U-shaped microwave waveguide 14.

A fuze modulation generator and timing base circuit 15 is indicated in broken lines and has various circuits connected to a test recorder 16. A closing rate adjustment 17 is provided and varies the speed of the tape playback mechanism 18 which is adapted to play back a recording of actual or simulated Doppler frequencies on one channel and a varying frequency corresponding to the variation of attenuation on another channel and have recorded signals correspond to those actually occurring at a certain closing rate during the approach of a missile to a target. It will be apparent that by varying the speed of playback that the effect of different closing rates may be obtained.

The Doppler frequency from the one channel is amplified in the amplifier 19 and applied to the gastube modulator 21 to modulate the transmitted frequency in the same manner as the velocity of approach between the missile and target aircraft would modulate the carrier frequency in actual flight.

The other channel of the tape playback mechanism 18 consisting of the varying frequency which corresponds to the variation of attenuation is passed through a modulator 22 which provides a variable voltage output which is connected to the variable gastube microwave attenuator 23 to simulate the effect of decreasing attenuation and increasing signal strength due to approach of the missile containing the fuze to the target.

A pulse generator 24 is connected to the tape playback mechanism 18 and to the fuze 11 providing a pulse to initiate their action at the proper time and is also connected to the recorder to provide a series of uniform pulses as a timing base for the test operations. The pulse generator 24 may be initiated manually or automatically when the energy reaching the probe 25 is sufficient to continue the tests. Alternatively, the tape playback mechanism 18 may be started and when the attenuation has decreased to the point where the fuze under test is receiving sufficient energy through its receiving antenna 13 the fuze will send a signal to the recorder and initiate its own normal action.

The test recorder 16 is also connected to a test probe 25 mounted between the attenuator 26 and modulator 21 in the waveguide 14 and the recorder 16 is also connected to the fuze 11 which is under test as well as the various circuitry of the fuze modulation generator 15.

*Operation*

In the operation of the system and apparatus of the present invention as illustrated in the figure of the drawing the modulation generator and timing base circuit 15 controls the modulation of tube 21 and attenuation of tube 23, and determines the sequence of operations.

The fuze 11 is first actuated and transmits RF/FM energy through the transmitter 12 into the open end of the waveguide 14. The probe 25 measures the amount of energy passing the fixed attenuator 26 and if the fuze is transmitting sufficient energy the operation of the tape playback 18 may be initiated by a pulse from pulse generator 24. The same pulse also goes to the fuze simulating a range pulse to initiate the fuze computer.

The RF energy is modulated by the gastube modulator 21 in accordance with the frequency variation from amplifier 19 and then is attenuated by the variable attenuator 23 in accordance with the output of modulator 22. If the energy received by the fuze receiving antenna 13 is sufficient, corresponding to the signal strength at maximum fuze to target distance, then the operation may be continued with the attenuation of the tube 23 decreasing to increase the signal received by the fuze 11 equivalent to the effect of the decreasing distance between the missile containing the fuze and the target.

The frequency recorded on the first channel of the playback mechanism 18 may be a constant frequency which can be varied by changing the speed of the playback mechanism 18, thus simulating the Doppler action during the major portion of the missile flight, or the recording on this first channel may be an actual recording of a run wherein the Doppler frequency will be substantially constant until just shortly before the time when the missile closely approaches the target, at which time a spectrum of Doppler frequencies will appear which may be utilized for controlling the fuze action. It will be apperent that this actual recording may be used to simulate approaches at different speeds by varying the speed of the playback mechanism 18 and will closely simulate actual runs including the close-in approach at various speeds.

At a proper time dependent upon the fuze computer action, received Doppler signal, and the strength of the signal the fuze will send a firing pulse to the recorder thus completely checking the fuze operation.

The modulation generator and timing base circuit 15 may obviously be elaborated to provide for any desired sequence of operations and with additional circuits for stopping the operation, if at any time the monitored signals are of insufficient or of incorrect characteristics.

While the preferred embodiment illustrated in the figure of the drawing has been shown consisting of a substantially U-shaped microwave waveguide and the modulator 21 and variable attenuator 23 have been indicated as being of the gastube type, it will be apparent that the waveguide may take any form which provides for an open end adjacent the transmitter and another open end adjacent the receiving antenna of the fuze 11, and the modulator 21 and variable attenuator 23, as well as the fixed attenuator 26, may be of the ferrite type requiring only a slight modification of the characteristics of the amplifier 19 and the modulator 22 to provide the proper current and voltage for operation of this type of element.

The output of the amplifier 19, the modulator 22, and the pulse generator 24 are all connected to separate channels on the multiple channel recorder 16, as well as any desired circuits in the fuze 11 under test for monitoring of the complete operation.

It will be apparent that the basic concepts of the present invention can be utilized for modulating and attenuating the RF energy in a waveguide with either AM or FM modulation for analogous purposes.

Obviously, many modifications and variations of the present invention are possible in the light of the above teachings. It is therefore to be understood that within the scope of the appended claims the invention may be practiced otherwise than as specifically described.

What is claimed is:

1. Apparatus for modulating and attenuating RF energy comprising an open ended loop waveguide adapted to have a fuze mounted with its transmitting antenna adjacent one open end and its receiving antenna adjacent the other open end, a fixed attenuator positioned in one portion of said waveguide, an electronically variable attenuator mounted in another portion of said waveguide, an electronically controllable modulator mounted in another portion of said waveguide, and electronic means for controlling said modulator and said variable attenuator to modulate and attenuate the RF energy transmitted by a fuze under test to simulate the Doppler effect and increase in signal strength during movement of a missile toward a target at the receiving antenna of the fuze.

2. Apparatus for modulating and attenuating RF microwave energy comprising a U-shaped microwave waveguide adapted to have a fuze mounted with its transmitting antenna adjacent one open end and its receiving antenna adjacent the other open end, a fixed attenuator positioned in one portion of said waveguide, a variable gastube attenuator mounted in another corner thereof, a microwave gastube modulator mounted in the intermediate portion of said waveguide between said fixed attenuator and said variable attenuator, and electronic means for controlling said gastube modulator and said variable gastube attenuator to modulate and attenuate the RF energy transmitted by a fuze under test to simulate the Doppler effect and increase in signal strength at the receiving antenna of the fuze during movement of a missile toward a target.

3. Apparatus for testing an FM Doppler fuze comprising an open ended waveguide adapted for mounting of a fuze with its transmitting antenna adjacent one open end of said waveguide and its receiving antenna adjacent the other open end of said waveguide, a fixed gastube attenuator mounted in said waveguide adjacent said one open end, a variable gastube attenuator mounted in said waveguide adjacent said other open end, a gastube modulator mounted in said waveguide between said fixed attenuator and said variable attenuator, a fuze modulation generator and timing base circuit having a closing rate adjustment, said modulation generator being adapted to control said gastube modulator and said variable gastube attenuator to modulate and attenuate the RF energy transmitted by a fuze under test to simulate the Doppler effect and increase in signal strength at the receiving antenna of the fuze during movement of a missile toward a target.

4. Apparatus for testing an FM Doppler fuze comprising an open ended waveguide adapted for mounting of a fuze with its transmitting antenna adjacent one open end of said waveguide and its receiving antenna adjacent the other open end of said waveguide, a fixed gastube attenuator mounted in one portion of said waveguide, a variable gastube attenuator mounted in another portion of said waveguide, a gastube modulator mounted in said waveguide between said fixed attenuator and said variable attenuator, a fuze modulation generator and timing base circuit having a closing rate adjustment, and a test recorder associated with said fuze modulation generator and adapted to be connected to the fuze being tested, said modulation generator being adapted to control said gastube modulator and said variable gastube attenuator to modulate and attenuate the RF energy transmitted by a fuze under test to simulate the Doppler effect and increase in signal strength at the receiving antenna of the fuze during movement of a missile toward a target.

5. Apparatus for testing an FM Doppler fuze comprising an open ended waveguide adapted for mounting of a fuze with its transmitting antenna adjacent one open end of said waveguide and its receiving antenna adjacent the other open end of said waveguide, a fixed gastube attenuator mounted in one portion of said waveguide, a variable gastube attenuator mounted in another portion of said waveguide, a gastube modulator mounted in said waveguide between said fixed attenuator and said variable attenuator, a fuze modulation generator and timing base circuit having a closing rate adjustment, a test recorder associated with said fuze modulation generator and adapted to be connected to the fuze being tested, said modulation generator including playback means and associated electronic circuitry adapted to control said gastube modulator and said variable gastube attenuator to modulate and attenuate the RF energy transmitted by a fuze under test to simulate the Doppler effect and increase in signal strength at the receiving antenna of the fuze during movement of a missile toward a target.

6. A method of testing an FM Doppler fuze comprising the steps of energizing the fuze, guiding the RF/FM energy from the transmitting antenna of said fuze to the receiving antenna thereof, modulating the energy to simulate the Doppler effect of a missile approaching a target, varying a subsequent attenuation of the energy to simulate the approach of a missile to the target by increasing the RF energy passed to the receiving antenna, actuating said fuze to initiate the fuze computer action, and recording the signals resulting from the response and operation of said fuze.

7. A method of testing an FM Doppler fuze comprising the steps of energizing the fuze, guiding the RF/FM energy from the transmitting antenna of said fuze to the receiving antenna thereof, attenuating the energy, electronically modulating the RF energy at a rate and with a suitable frequency spectrum to simulate the Doppler effect of a missile approaching a target, varying a subsequent attenuation of the energy at rate to simulate the approach of a missile to the target by increasing the RF energy passed to the receiving antenna, and actuating said fuze by applying a range pulse to simulate a predetermined range and initiate the fuze computer action, and recording the signals resulting from the response and operation of said fuze.

8. A method of testing an FM Doppler fuze comprising the steps of energizing the fuze, guiding the RF/FM energy from the transmitting antenna of said fuze to the receiving antenna thereof, attenuating the energy, electronically modulating the RF energy at a rate and with a suitable frequency spectrum to simulate the Doppler effect of a missile approaching a target, varying a subsequent attenuation of the energy at a rate to simulate the approach of a missile to the target by increasing the energy passed to the receiving antenna, measuring the energy passing the first attenuator to determine if the energy is sufficient to continue testing, measuring the energy received by the fuze to determine if the energy is sufficient to continue testing, and actuating said fuze to simulate a predetermined range and initiate the fuze computer action, and recording the signals resulting from the response and operation of said fuze.

9. A method of testing an FM Doppler fuze comprising the steps of energizing the fuze, guiding the RF/FM energy from the transmitting antenna of said fuze to the receiving antenna thereof, attenuating the energy, modulating the RF energy in accordance with a predetermined closing rate to simulate the Doppler effect of a missile approaching a target, varying a subsequent attenuation of the RF energy in accordance with said rate to simulate the approach of a missile to the target by increasing the RF energy passed to the receiving antenna, measuring the energy passing the first attenuator to determine if the energy is sufficient to continue testing, measuring the energy received by the fuze to determine if the energy is sufficient to continue testing, and actuating said fuze by applying a range pulse to simulate a predetermined range and initiate the fuze computer action, and recording the signals resulting from the response and operation of said fuze.

10. A method of testing an FM Doppler fuze comprising the steps of energizing the fuze, guiding the RF/FM energy from the transmitting antenna of said fuze to the receiving antenna thereof, modulating the energy to simulate the Doppler effect of a missile approaching a target, varying a subsequent attenuation of the energy to simulate the approach of a missile to the target by increasing the RF energy passed to the receiving antenna, and indicating the response in operation of said fuze.

References Cited in the file of this patent

UNITED STATES PATENTS

| | | |
|---|---|---|
| 2,461,005 | Southworth | Feb. 8, 1949 |
| 2,683,855 | Blitz | July 13, 1954 |
| 2,765,445 | Zaleski | Oct. 2, 1956 |